(12) United States Patent
Eberle et al.

(10) Patent No.: US 7,083,202 B2
(45) Date of Patent: Aug. 1, 2006

(54) DEVICE FOR PROVIDING WALL DUCTS FOR, AND PROCESS OF ASSEMBLING, CONDUITS, TUBING OR ELECTRIC CABLES FOR MOTOR VEHICLES

(75) Inventors: Wilfried Eberle, Ehingen (DE); Heiner Klatte, Damme (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/622,643

(22) Filed: Jul. 21, 2003

(65) Prior Publication Data
US 2004/0037627 A1    Feb. 26, 2004

(30) Foreign Application Priority Data
Jul. 20, 2002    (DE) ................................ 102 33 127

(51) Int. Cl.
*F16L 39/00* (2006.01)
(52) U.S. Cl. ................ 285/124.4; 285/124.2; 285/124.5; 285/321; 285/140.1
(58) Field of Classification Search ............ 285/124.1, 285/124.2, 124.3, 124.4, 124.5, 321, 140.1, 285/139.3, 139.1
See application file for complete search history.

(56) References Cited

U.S. PATENT DOCUMENTS

| | | | | |
|---|---|---|---|---|
| 3,869,152 A | * | 3/1975 | DeVincent et al. | 285/124.3 |
| 3,869,153 A | * | 3/1975 | De Vincent et al. | 285/124.3 |
| 4,482,172 A | | 11/1984 | DeVera et al. | |
| 4,630,847 A | * | 12/1986 | Blenkush | 285/29 |
| 4,893,845 A | * | 1/1990 | Bartholomew | 285/124.4 |
| 5,297,820 A | * | 3/1994 | Martin | 285/124.2 |
| 5,865,474 A | * | 2/1999 | Takahashi | 285/124.1 |
| 5,951,059 A | * | 9/1999 | Kitamura | 285/139.3 |
| 6,035,891 A | * | 3/2000 | Hawkins et al. | 285/124.1 |
| 6,520,545 B1 | * | 2/2003 | Johll et al. | 285/124.1 |
| 6,609,732 B1 | * | 8/2003 | Souvatzidis et al. | 285/124.5 |

FOREIGN PATENT DOCUMENTS

DE    3226475 A1    1/1984

* cited by examiner

*Primary Examiner*—David Bochna
(74) *Attorney, Agent, or Firm*—Crowell & Moring LLP

(57) ABSTRACT

In a device for providing wall ducts for conduits, tubing or electric cables for motor vehicles, each of the conduits, tubing or electric cables, in the area of the wall duct, has a coupler. Each coupler includes two coupler halves. First coupler halves, respectively, are jointly held in the device providing wall ducts. The first coupler halves are held together in groups of at least two by a bracket, and the coupler halves bundled this way are held in plugs, which are arranged in orifices of a wall.

10 Claims, 5 Drawing Sheets

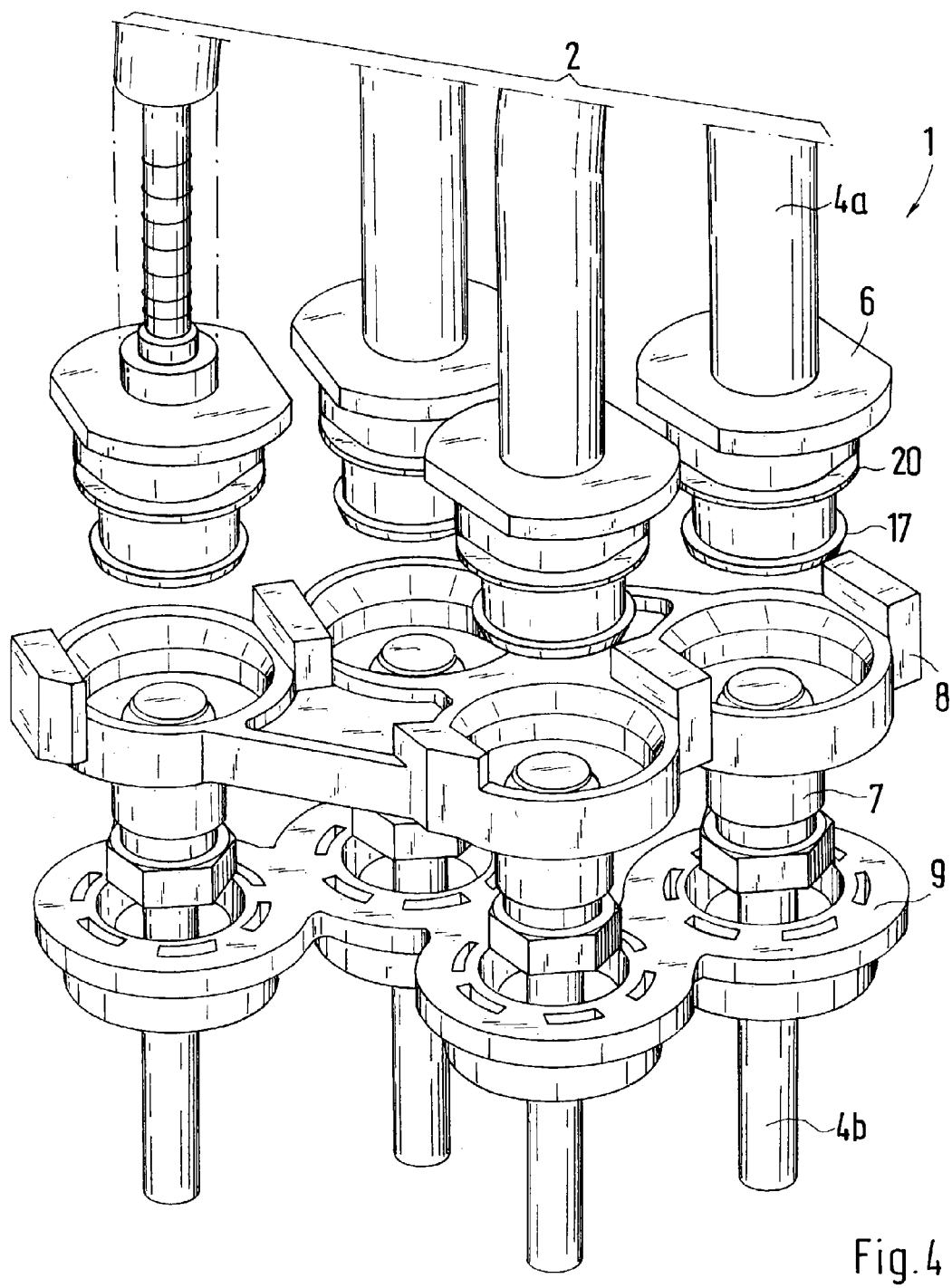
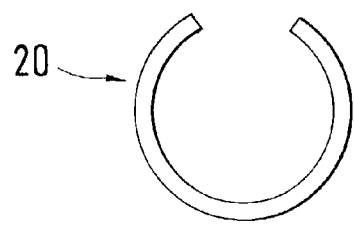
Fig.4
Fig.5

DEVICE FOR PROVIDING WALL DUCTS FOR, AND PROCESS OF ASSEMBLING, CONDUITS, TUBING OR ELECTRIC CABLES FOR MOTOR VEHICLES

This application claims the priority of German application 102 33 127.8, filed Jul. 20, 2002, the disclosure of which is expressly incorporated by reference herein.

BACKGROUND AND SUMMARY OF THE INVENTION

The present invention relates to a device for providing wall ducts for conduits, tubing or electric cables—described in the following with the collective term of wiring—for motor vehicles in which each conduit, tube or electric cable in an area of a wall duct contains a coupler, in which the coupler includes two coupler halves, and in which first coupler halves, respectively, are jointly held in the device for providing wall ducts.

From German publication DE 32 26 475 A1 we already know of a sealing wall passage for conduits, tubing, and electric cables for motor vehicles where cable couplers are provided in the wiring. A first coupler half of these cable couplers can be fastened in a cover plate so as not to rotate and seal the configuration. The cover plate is equipped for this purpose with corresponding through holes, in which the first coupler halves or blind plugs are held in a snap-fit fashion. In this way, even a bunch of wires can be guided through a wall in the body of the vehicle in a sealed manner. Additionally, assembly of the lines is simplified because they can be pre-assembled, connected, and checked.

Proceeding from this state of the art, it is one object of the present invention to create a device for providing wall ducts for conduits, tubing, or electric cables which is further simplified with regard to assembly.

This object is accomplished pursuant to the invention by holding the first coupler halves of the cable couplers, respectively, together as at least one group with a bracket to combine them into at least two first coupler halves and to keep the coupler halves bundled this way into plugs, which are arranged in orifices of a wall. By combining the first coupler halves with the help of the bracket, a module that is supposed to be installed in the vehicle, including its wiring, can be pre-assembled, checked, and prepared for assembly outside the vehicle. By grouping the coupler halves, these tasks, as well as subsequent assembly of the coupler halves in the wall orifices, are facilitated. Assembly of the coupler halves in the wall orifices is then particularly easy when no visual contact of the wall orifices is possible during assembly of the wiring. Due to the fact that each coupler half has its own orifice in the wall of the vehicle body, this orifice is generally easy to install as a circular opening, seals well and is easy to adjust to different vehicle types with varying numbers of wires.

Further developments of the invention are described in the dependent claims. A process of conduit, tubing, or electric cable assembly is also disclosed.

It is suggested, for example, to make the plugs of elastic rubber material and to combine the plugs into groups. By using elastic rubber material, the coupler halves are beneficially insulated against the wall from a vibration point of view so that the wiring is decoupled from the vibrations of the body of the vehicle and guided through the wall. Pressure fluctuations and other fluctuations in the wiring thus no longer induce vibration in the wall, which would be clearly audible in the interior of the vehicle. By combining the plugs into groups, production and assembly of the plugs is simplified because all plugs that are required for the wall duct can be combined into one part. At the same time, however, the individual seal of each coupler half is guaranteed by the fact that a separate plug is provided in each wall orifice. When, as is furthermore suggested, the plugs are equipped with a step, which acts together in a snap-fit fashion with a protrusion provided on the first coupler half, then, apart from the plug, no additional means are required to route the first coupler halves in the wall orifice safely and sealed.

Finally, it is suggested to provide a retainer ring for connecting the first coupler halves with the bracket, with the ring inserted in a groove that is incorporated on the exterior of the first coupler half. Corresponding to this first groove, a second groove, respectively, is incorporated in the orifices, which are provided in the bracket for holding the first coupler half. When the first coupler half is inserted into the orifice, the retainer ring is initially compressed. When the first coupler half has reached its final position, the retainer ring can expand again and engage in the second groove. Due to the fact that the retainer ring rests between the first groove and the second groove, the first coupler half is connected with the bracket.

Particularly when the two coupler halves of the cable coupler are supposed to be connected with each other through screws, it is necessary to fasten to the first coupler halves in the bracket to prevent them from rotating. For this purpose, the first coupler halves, for example, are equipped with a hexagon or flattened areas, which then find support on corresponding resting surfaces of the mounting device.

The invention is explained in more detail in the following based on the design shown in the drawing figures.

BRIEF DESCRIPTION OF THE DRAWINGS

FIG. 4 is an exploded view of the device for providing wall ducts, without the wall;

FIG. 5 is a view of a retainer ring;

DETAILED DESCRIPTION OF THE INVENTION

Figure 1:
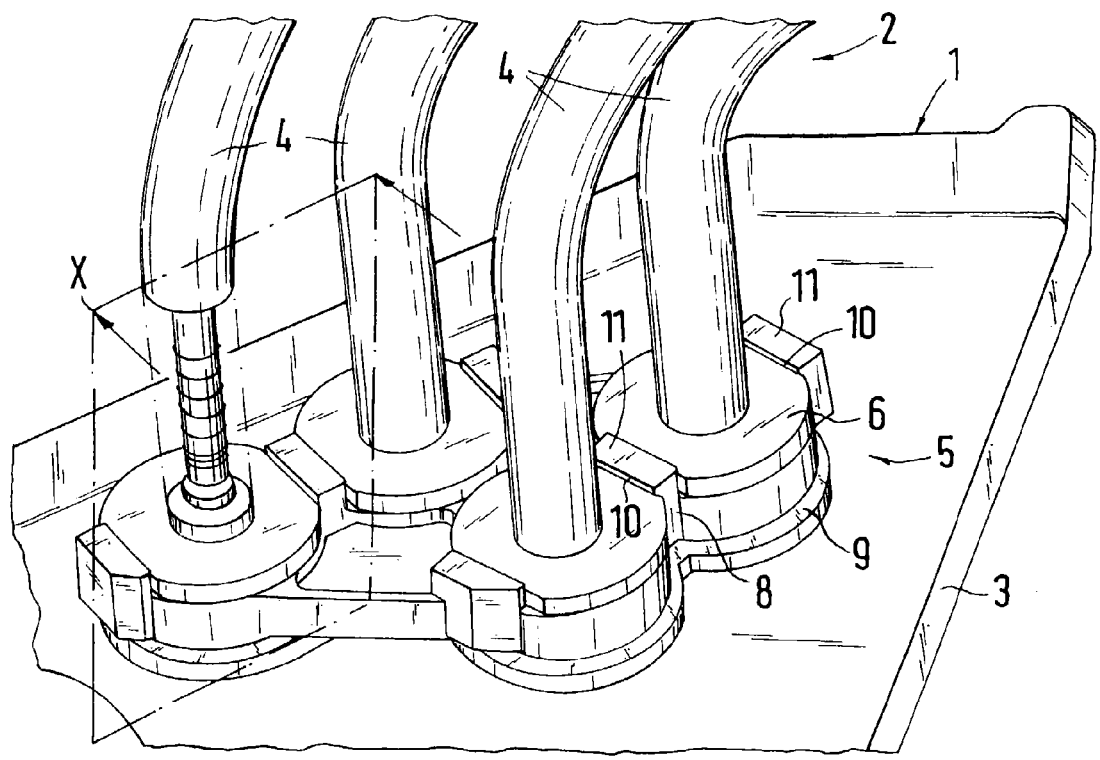
FIG. 1 is a front view of a device for providing wall ducts pursuant to the invention.
Figure 2:
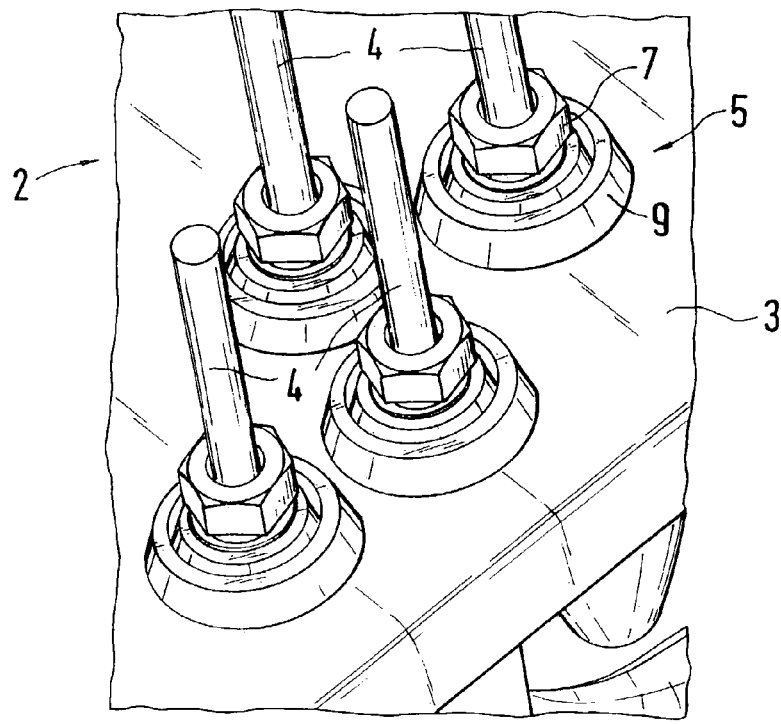
FIG. 2 is a rear view of the device for providing wall ducts.

The device for providing wall ducts shown in FIG. 1 serves to guide a bundle 2 of wiring 4, here hydraulic lines, through a wall 3 of a body of a motor vehicle, not shown in detail. The wiring 4 is equipped with cable couplers 5, each of which has a first coupler half 6 and a second coupler half 7. Sections 4a, 4b of the wiring 4 are connected with the coupler halves 6, 7. The first coupler halves 6 are held together by means of a bracket 8. The first coupler halves 6 are held in the wall 3 with elastic rubber plugs 9 in a sealed and vibration-insulated fashion. For each cable coupler 5, a separate plug 9 is provided; this plug is held in the wall 3 in its own orifice 12 (see FIG. 3), respectively. The first coupler halves 6 are laterally equipped with flattened areas 10, which are seated between protrusions 11 of the bracket 8 so that the first coupler halves 6 are held in the bracket 8 in a way that prevents them from rotating.

Figure 3:
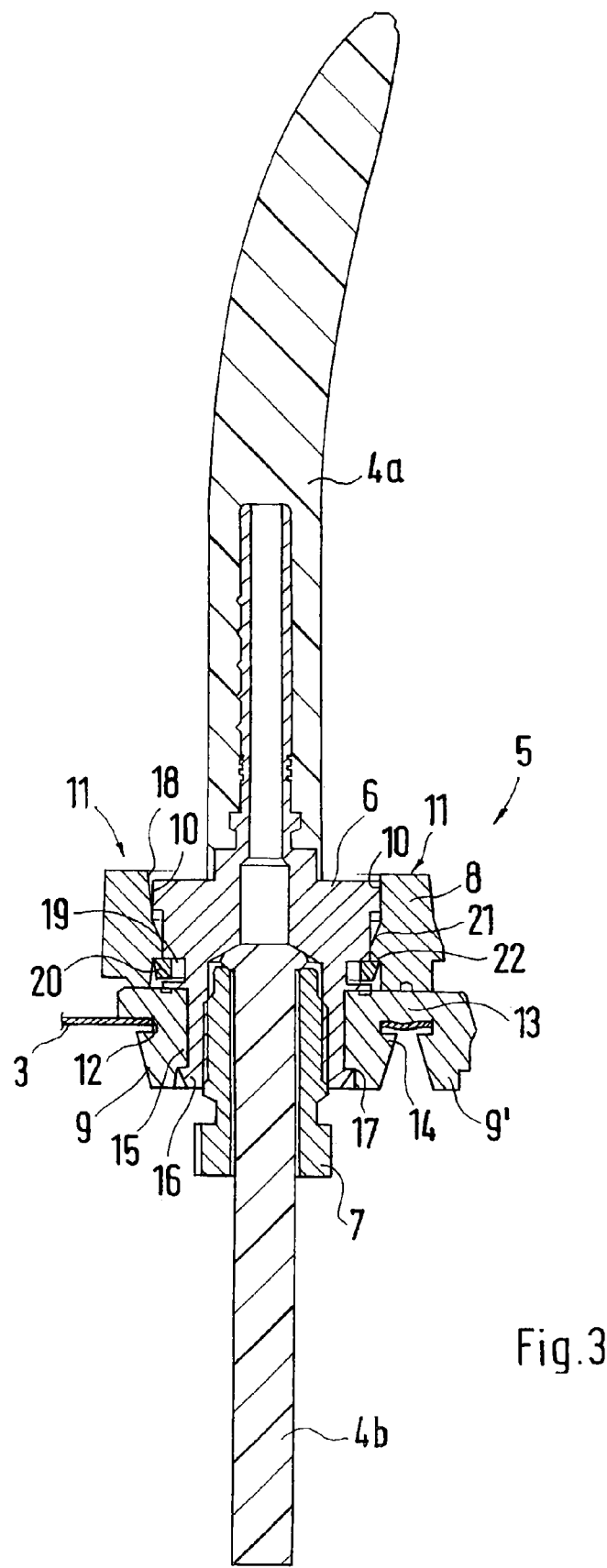
FIG. 3 is a sectional view along the plane X of FIG. 1.

FIG. 3 shows wiring 4 with a cable coupler 5 in the mounted state in a sectional view. The first section 4a of the wiring 4—here a tubing section—is connected with the first coupler half 6 by being placed on top. The second section 4b of the wiring 4—here a conduit section—is connected with the first coupler half 6 through the second coupler half 7, which in the present example is designed as a union nut.

The wall 3 contains orifices 12, of which here only one is shown as an example. In the orifice 12, the plug 9 has been inserted, which for reasons of facilitating assembly is connected with the adjacent plug 9 via a strip 13. The plug 9 is held in the orifice 12 by means of a peripheral nose 14, which engages behind the orifice 12.

The first coupler half 6 is seated in the plug 9 with a cylindrical area 15 in such a way that the plug 9 forms a seal between the wall 3 and the first coupler half 6. On the end of the cylindrical area 15, a peripheral nose 16 is provided, which engages behind a step 17 provided in the plug. In this way, the first coupler half 6 is fastened in the plug 9 in a snap-fit fashion.

The bracket 8 is connected exclusively with the first coupler half 6 and contains an orifice 18 for receiving the first coupler half 6. The edge of the orifice 18 includes the protrusions 11 that support the flattened areas 10 of the first coupler half 6 and thus secure the first coupler half 6 against torsion.

For the purpose of locking the first coupler half 6 in the bracket 8, a peripheral groove 19 is incorporated in the first coupler half 6, and a retainer ring 20 is inserted in the groove. The retainer ring 20 (shown in the top view in FIG. 5) is of a resilient material and contains a gap. When inserting the first coupler half 6 into the orifice 18 of the bracket 8, the retainer ring 20 is compressed, supported by a taper 21, in the orifice 18 and pressed into the groove 19. When the first coupler half 6 reaches its final position in the bracket 8, the retainer ring 20 can expand again and engage behind a step 22, which is provided at the end of the orifice 18. In this position, the retainer ring 20 connects the first coupler half 6 and the bracket 8 with a positive fit. In the depicted example, the retainer ring 20 contains a taper corresponding on the outside to the taper 21 in order to facilitate insertion of the coupler half 6 and the associated compression of the retainer ring 20.

FIG. 4 shows the individual components of the wall duct 1 without the wall 3 again in an exploded view.

For assembly, initially, the parts 4a of the wiring are equipped with the first coupler halves 6. The first coupler halves 6 are then pressed so far into the bracket 8 that the retainer rings 20 snap in. The conduit bundle is now combined into a unit at the end by the bracket 8. Independent from this, the plugs 9 are inserted into orifices 12 of the wall 3.

Actual assembly of the conduit bundle 2 now occurs by pushing the first coupler halves 6, which are held together with the bracket 8, far enough into the respective plugs 9 that they latch into the peripheral protrusion 17. From the other side of the wall 3, the second section 4b can now be assembled in a later operation by fastening the second coupler half 7 in the first coupler half 6.

Figure 6:
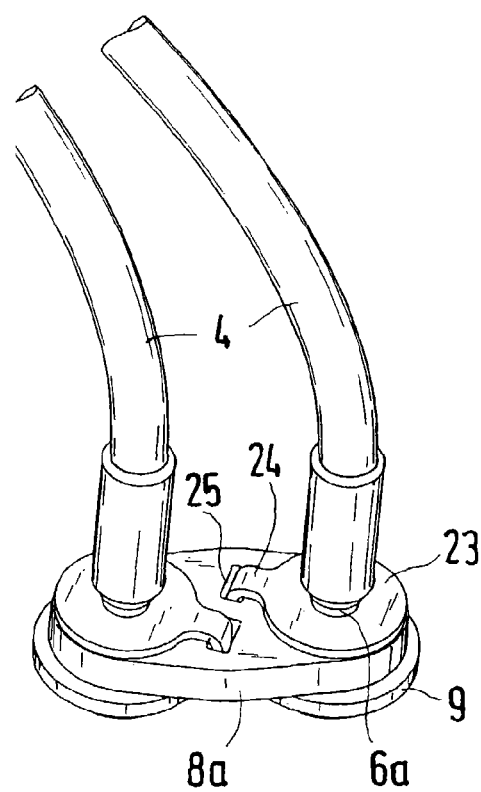
FIG. 6 is view of a second design of the device for providing wall ducts.

FIG. 6 shows a second design of the device for providing wall conduits for the wiring 4 through a wall, of a body of a motor vehicle which is not shown here. The wiring 4 in turn is equipped with cable couplers, of which here only the first coupler halves 6a are shown. Contrary to the first design, here two first coupler halves 6 are combined into a group by a bracket 8a; a total of 2 brackets 8a are required to combine a wire bundle consisting of four wiring portions 4 into groups of wirings 4.

Like in the first design, the first coupler halves 6a are held in the wall with elastic rubber plugs 9 in a sealed and vibration-insulated fashion, which in the present example are also combined into a group of two plugs 9, corresponding to the first coupler halves 6a. It is not necessary that the group of the first coupler halves 6a contain the same number as the group of plugs 9; the group size is rather dependent upon the conditions encountered during assembly of the respective components.

To prevent torsion, on the first coupler halves 6a, each cable coupler 5 is equipped with its own plug 9, which is held in its own orifice 12 (see FIG. 3) in the wall 3. On the first coupler halves 6a, washer 23 is held in a stationary position, for example by means of soldering, wherein the washers 23 each contain a nose 24. Each nose 24 engages the corresponding recess 25, which is provided in the bracket 8a, so that the first coupler halves 6a are held in the bracket 8a in a way that prevents torsion.

Figure 7:
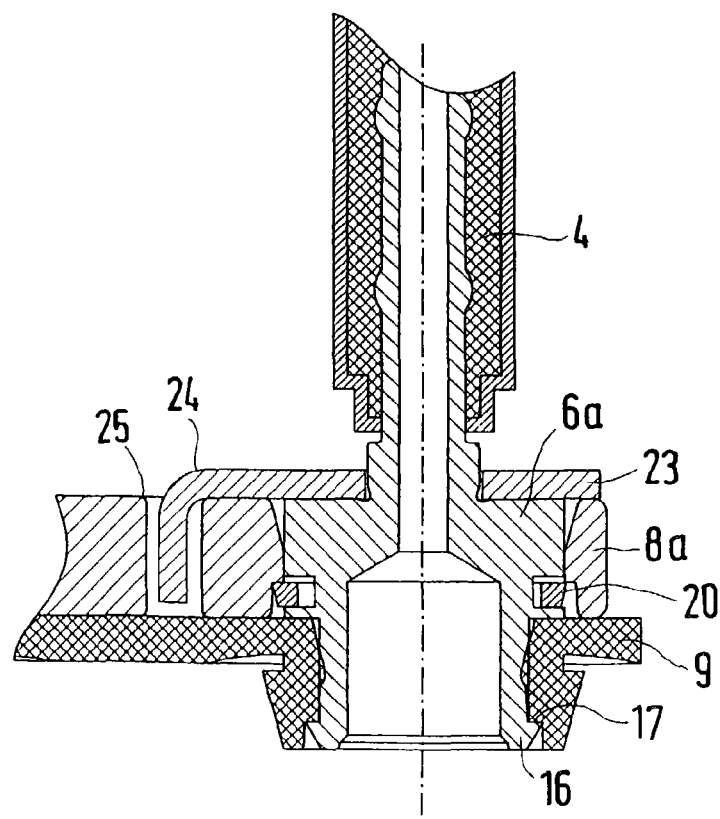
FIG. 7 is a sectional view of a part of the design shown in FIG. 6.

FIG. 7 depicts a main section through one of the first coupler halves 6a of the second design. It is clearly visible that the nose 24 engages the recess 25. The remaining design of the coupler halves 6a corresponds to the first design, particularly the snap-fit of the coupler halves 6a in the bracket 8a with the help of the retainer ring 20 and the snap-fit of the coupler halves 6a in the plug 9 by means of the peripheral noses 16, which are incorporated on the coupler halves 6a and engage behind a step 17 provided in the plug 9.

Figure 8:
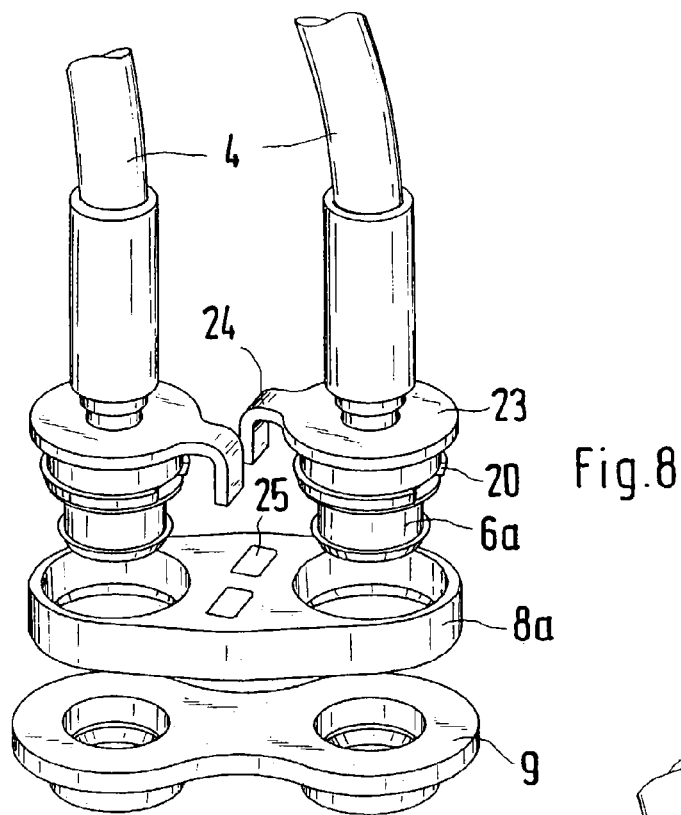
FIG. 8 is an exploded view from above the device shown in 6.
Figure 9:
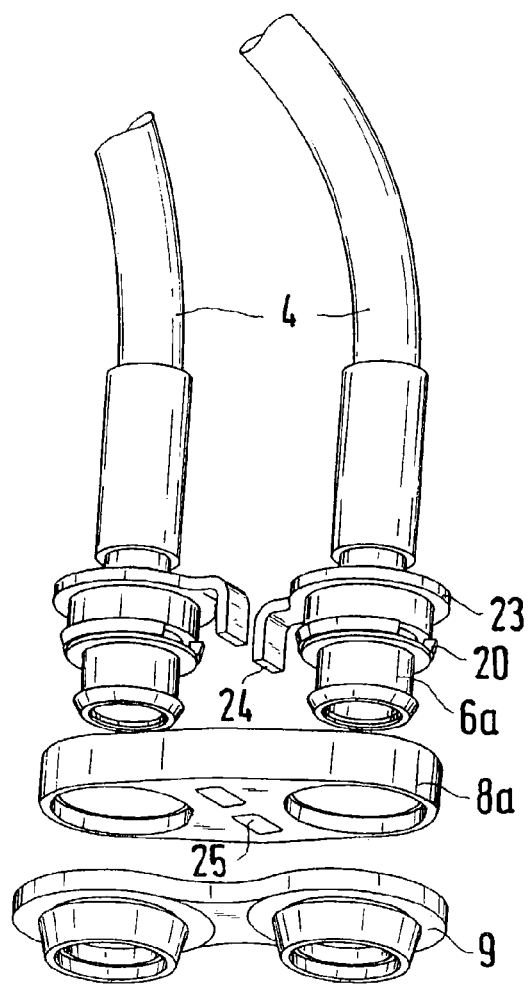
FIG. 9 is an exploded view from beneath the device shown in 6.

FIG. 8 and FIG. 9 show the second design again in an exploded view.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A device for providing wall ducts for conduits, tubing or electric cables for a motor vehicle,
   wherein each conduit, tube or electric cable in an area of a wall duct contains a coupler, the coupler comprising two directly coupled coupler halves, first coupler halves of said two coupler halves, respectively, being jointly held in the device for providing wall ducts,
   wherein at least two first coupler halves, respectively, are held together by a bracket which is not connected to a wall having the wall ducts,
   wherein plugs for receiving the first coupler halves are provided in orifices of a wall, with each of the first coupler halves held in its own plus and with each of the plugs held in its own orifice in the wall,
   wherein the first coupler halves are locked in the bracket and fastened in the plugs, and
   wherein the plugs are made of elastic rubber material and are combined into groups.

2. The device according to claim 1, wherein the plugs contain steps which act together with protrusions provided on the first coupler halves in a snap-fit fashion.

3. The device according to claim 1, wherein second coupler halves of said two coupler halves are directly fastened to the first coupler halves.

4. A device for providing wall ducts for conduits, tubing or electric cables for motor vehicles,
   wherein each conduit, tube or electric cable in an area of a wall duct contains a coupler, the coupler comprising two coupler halves, first coupler halves of said two coupler halves, respectively, being jointly held in the device for providing wall ducts,
   wherein at least two first coupler halves, respectively, are held together by a bracket,
   wherein plugs for receiving the first coupler halves are provided in orifices of a wall,
   wherein the first coupler halves are held in the plugs,
   wherein, in an orifice which is provided in the bracket for receiving a first coupler half as well as in that first coupler half, corresponding grooves are incorporated, and
   wherein, in the groove of the first coupler half, a retainer ring is inserted.

5. A device for providing wall ducts for conduits, tubing or electric cables for a motor vehicle, comprising:
   a coupler provided for each of the conduits, tubes or electric cables in an area of one of the wall ducts, each coupler comprising first and second directly coupled coupler halves,
   a bracket by which at least two first coupler halves are jointly held together and which is not connected to a wall having the wall ducts, and
   plugs for receiving the at least two first coupler halves provided in orifices of a wall, with each of the first coupler halves held in its own plug and with each of the plugs held in its own orifice in the wall,
   wherein at least two first coupler halves are locked in the bracket and fastened in at least two of the plugs, and
   wherein the plugs are made of elastic rubber material and are combined into groups.

6. The device according to claim 5, wherein at least one of the plugs contains a step which acts, together with a protrusion provided on one of the first coupler halves, in a snap-fit fashion.

7. The device according to claim 5, wherein second coupler halves of said two coupler halves are directly fastened to the first coupler halves.

8. A device for providing wall ducts for conduits, tubing or electric cables for motor vehicles, comprising:
   a coupler provided for each of the conduits, tubes or electric cables in an area of one of the wall ducts, each coupler comprising first and second coupler halves,
   a bracket by which at least two first coupler halves are jointly held together, and
   plugs for receiving the at least two first coupler halves provided in orifices of a wall,
   wherein at least two first coupler halves are held in at least two of the plugs,
   wherein corresponding grooves are incorporated in an orifice provided in the bracket and in at least one of the first coupler halves, and
   wherein a retainer ring is inserted in the groove incorporated in the at least one of the first coupler halves.

9. A device for providing wall ducts for conduits, tubing or electric cables for motor vehicles, comprising:
   a coupler provided for each of the conduits, tubes or electric cables in an area of one of the wall ducts, each coupler comprising first and second coupler halves,
   a bracket by which at least two first coupler halves are jointly held together, and
   plugs for receiving the at least two first coupler halves provided in orifices of a wall,
   wherein at least two first coupler halves are held in at least two of the plugs,
   wherein at least one of the plugs contains a step which acts, together with a protrusion provided on one of the first coupler halves, in a snap-fit fashion,
   wherein corresponding grooves are incorporated in an orifice provided in the bracket and in at least one of the first coupler halves, and
   wherein a retainer ring is inserted in the groove incorporated in the at least one of the first coupler halves.

10. A device for providing wall ducts for conduits, tubing or electric cables for motor vehicles, comprising:
    a coupler provided for each of the conduits, tubes or electric cables in an area of one of the wall ducts, each coupler comprising first and second coupler halves,
    a bracket by which at least two first coupler halves are jointly held together, and
    plugs for receiving the at least two first coupler halves provided in orifices of a wall,
    wherein at least two first coupler halves are held in at least two of the plugs,
    wherein corresponding grooves are incorporated in an orifice provided in the bracket and in at least one of the first coupler halves, and
    wherein a retainer ring is inserted in the groove incorporated in the at least one of the first coupler halves.

* * * * *